(12) United States Patent
Molina et al.

(10) Patent No.: US 11,797,030 B2
(45) Date of Patent: Oct. 24, 2023

(54) CARTRIDGE FLOW RATE ADJUSTING ASSEMBLY WITH COMPENSATING CHAMBER AND HYDRAULIC VALVE COMPRISING THE CARTRIDGE FLOW RATE ADJUSTING ASSEMBLY

(71) Applicant: Giacomini S.p.A., San Maurizio d'Opaglio (IT)

(72) Inventors: Samuele Molina, San Maurizio d'Opaglio (IT); Giuliano Ruga, San Maurizio d'Opaglio (IT); Marco Rosa Brusin, San Maurizio d'Opaglio (IT); Paolo Arrus, San Maurizio d'Opaglio (IT)

(73) Assignee: Giacomini S.p.A

( * ) Notice: Subject to any disclaimer, the term of this patent is extended or adjusted under 35 U.S.C. 154(b) by 119 days.

(21) Appl. No.: 17/432,339

(22) PCT Filed: Feb. 13, 2020

(86) PCT No.: PCT/IB2020/051171
§ 371 (c)(1),
(2) Date: Aug. 19, 2021

(87) PCT Pub. No.: WO2020/183258
PCT Pub. Date: Sep. 17, 2020

(65) Prior Publication Data
US 2022/0252162 A1 Aug. 11, 2022

(30) Foreign Application Priority Data

Mar. 8, 2019 (IT) .......................... 102019000003389

(51) Int. Cl.
*G05D 7/01* (2006.01)
*G05D 16/00* (2006.01)
(Continued)

(52) U.S. Cl.
CPC ........... *G05D 7/0106* (2013.01); *F16K 1/526* (2013.01); *F16K 39/022* (2013.01);
(Continued)

(58) Field of Classification Search
CPC ......... Y10T 137/7796; Y10T 137/7795; F16K 1/526; G05D 16/024; G05D 7/0106; F24D 19/1015
(Continued)

(56) References Cited

U.S. PATENT DOCUMENTS 2,897,836 A * 8/1959 Peters .................... F16K 39/022
137/625.5
3,181,560 A * 5/1965 Worden ................. F16K 17/168
251/282

(Continued)

FOREIGN PATENT DOCUMENTS

DE 19623718 C1 1/1998
EP 3067772 A2 9/2016
(Continued)

OTHER PUBLICATIONS

International Search Report in related international application PCT/IB2020/051171 dated May 11, 2020; 5 pages.
(Continued)

*Primary Examiner* — William M McCalister
(74) *Attorney, Agent, or Firm* — Mark Malek; Jonathan Staudt; Widerman Malek, PL

(57) ABSTRACT

A cartridge flow rate adjusting assembly of a hydraulic valve may include a rod having a first end and a second end, a shutter integrally formed with the first end of the rod and to slidingly positioned against a passage opening of the valve for adjusting flow. The assembly may also include an elastic element to hold the rod with the shutter in a monostable position with the opening of the valve. A plunger element (Continued)

may be integrally formed with the rod and interposed between the shutter and second end. The assembly may further include a conduit formed in the rod. The opening of the valve may be in fluid communication with a portion of the chamber disposed between the plunger and second end so that a pressure in the portion of the chamber is equal to a pressure in the passage opening.

18 Claims, 8 Drawing Sheets

(51) Int. Cl.
  F16K 1/52 (2006.01)
  F16K 39/02 (2006.01)
  F24D 19/10 (2006.01)
(52) U.S. Cl.
  CPC ....... F24D 19/1015 (2013.01); G05D 16/024 (2019.01); Y10T 137/7796 (2015.04)
(58) Field of Classification Search
  USPC ........................ 137/505.13, 505.12
  See application file for complete search history.

(56) References Cited

U.S. PATENT DOCUMENTS

| | | |
|---|---|---|
| 3,318,577 A | 5/1967 | Banks |
| 4,341,370 A * | 7/1982 | Banks ................. F16K 39/022 74/552 |
| 5,386,965 A | 2/1995 | Marchal |
| 5,775,369 A * | 7/1998 | Hagmann ............ G05D 7/0106 137/501 |
| 7,000,895 B2 * | 2/2006 | Gessaman ........... F16K 31/0693 251/282 |
| 8,833,392 B2 * | 9/2014 | Norlander ............... F16K 47/04 137/625.33 |
| 9,910,447 B2 * | 3/2018 | Pettinaroli .............. F16K 3/246 |
| 9,983,594 B2 * | 5/2018 | Giubertoni ........... G05D 7/0106 |
| 10,132,509 B2 * | 11/2018 | Loeffler ................. G05D 16/06 |
| 10,935,272 B2 * | 3/2021 | Wang ................... G05D 7/0617 |
| 2007/0262279 A1 * | 11/2007 | Marstorp ........... F24D 19/1015 251/118 |
| 2010/0170581 A1 * | 7/2010 | Loeffler ................. G05D 7/005 137/553 |
| 2011/0042603 A1 * | 2/2011 | Loeffler ............... G05D 7/0106 251/324 |
| 2011/0068284 A1 * | 3/2011 | Jorgensen ........... G05D 7/0106 251/46 |
| 2019/0186775 A1 * | 6/2019 | Wang ................... G05D 7/0106 |

FOREIGN PATENT DOCUMENTS

| | | |
|---|---|---|
| EP | 3201500 A1 | 8/2017 |
| WO | 2018/051150 A1 | 3/2018 |
| WO | 2020/183258 A1 | 9/2020 |

OTHER PUBLICATIONS

Written Opinion in related international application CT/IB2020/051171 dated Sep. 17, 2020; 10 pages.

* cited by examiner

FIG.4
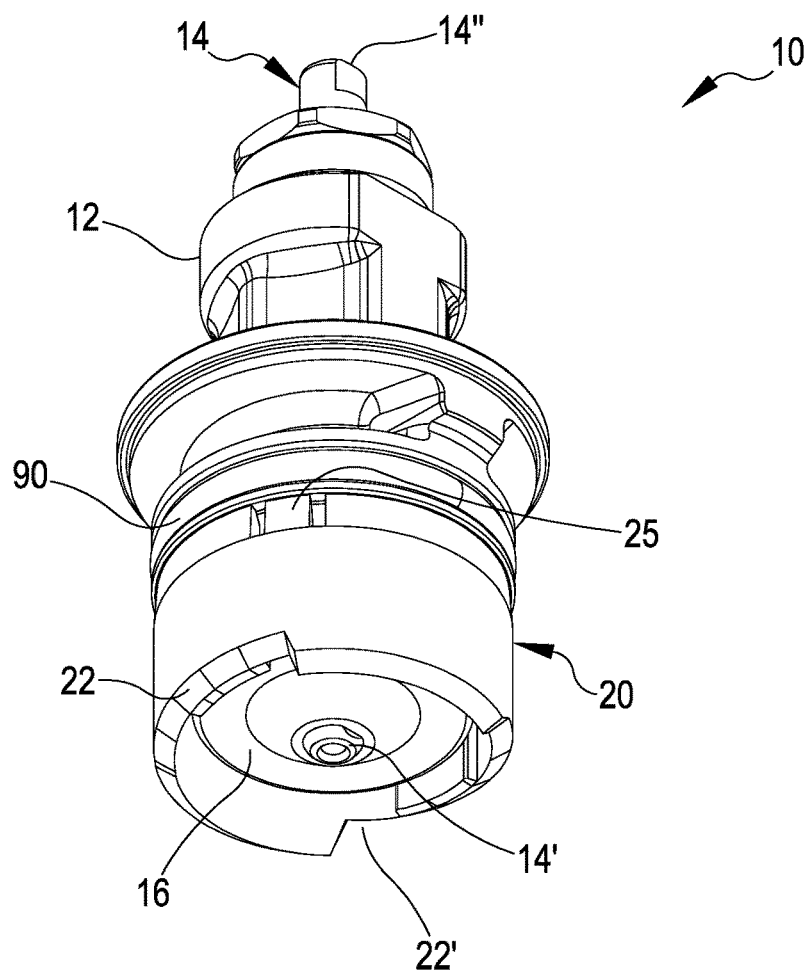
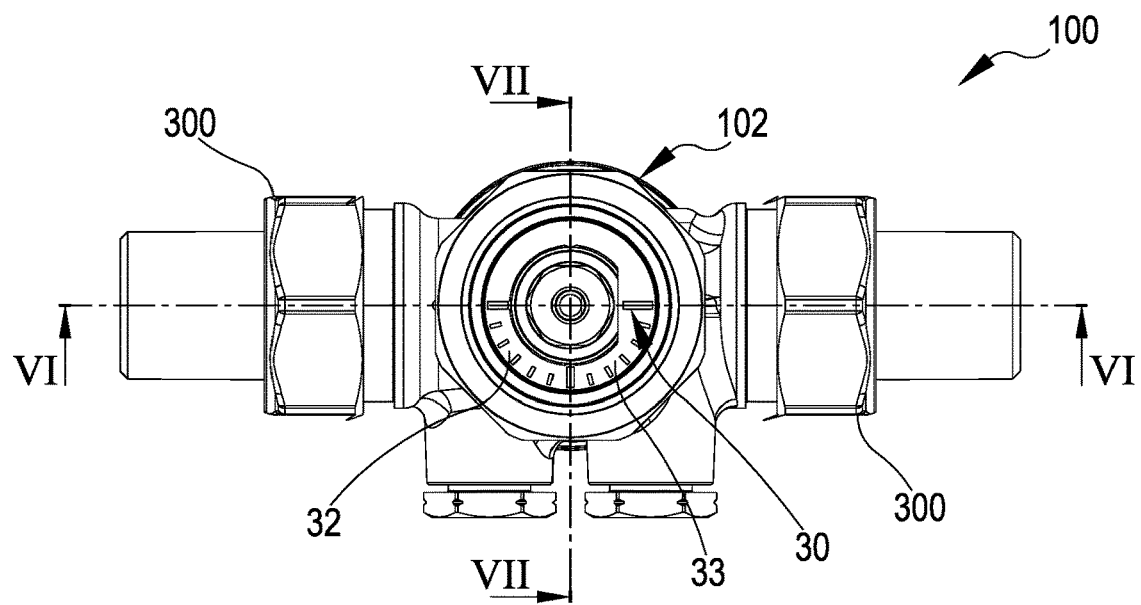
FIG.5

CARTRIDGE FLOW RATE ADJUSTING ASSEMBLY WITH COMPENSATING CHAMBER AND HYDRAULIC VALVE COMPRISING THE CARTRIDGE FLOW RATE ADJUSTING ASSEMBLY

RELATED APPLICATIONS

This application is a national phase application of and claims priority under 35 U.S.C. § 371 of PCT Application No. PCT/IB2020/051171 filed on Feb. 13, 2020 and titled CARTRIDGE FLOW RATE ADJUSTING ASSEMBLY WITH COMPENSATING CHAMBER AND HYDRAULIC VALVE COMPRISING THE CARTRIDGE FLOW RATE ADJUSTING ASSEMBLY, which claims the benefit of IT 102019000003389, filed on Mar. 8, 2019, each of which is hereby incorporated by reference in its entirety.

The present invention is directed to cartridges for hydraulic valves of a type comprising a shutter integral with a sliding rod.

The present invention refers to a cartridge adjusting assembly with a collar-stem shutter with a pre-adjusting sleeve, usable in simple hydraulic valves provided with a manual command, which can be motorized or made thermostatic, and which can integrate a system for dynamically balancing/compensating a flow rate.

STATE OF THE ART

Fluidic valves for adjusting the flow rate of a fluid adapted also for the static pre-adjustment are known and widely used in the field of hydraulic plants and thermotechnical and hydronic plants in the heating-plumbing field. Said hydraulic valves are generally also provided with means for balancing and compensating the inlet pressures and are typically indicated by the acronym PICV (Pressure Independent Control Valve).

These fluidic valves are hydraulic devices typically used in thermotechnical applications in which it is sought the availability at the inlet of a constant flow rate of a liquid fluid, generally water, independently from the pressure variations of the fluid which could occur upstream and downstream.

These known types of valves for dynamically adjusting and balancing the flow rate, enable a more versatile and simplified design and manufacture of hydronic plants in which the flow rate of a fluid thermal carrier to the ends of one or more users, such as heat exchangers, radiators, fan coil units, is required to be held constant. Moreover, the PICVs enable to adjust the flow rate independently from the upstream and downstream pressure conditions of the fluid, by keeping constant a preset flow rate.

More particularly, the adjusting/balancing valves or PICVs typically comprise three adjusting assemblies: a flow rate pre-adjusting assembly adapted to pre-select a maximum nominal inlet flow rate entering a user, a feedback adjusting assembly, typically a shutter, adapted to adjust or choke the flow rate of a required fluid thermal carrier as a function, for example, of the environment temperature and a balancing or compensating assembly adapted to keep constant the flow rate independently from the upstream and downstream pressure conditions of the valve.

The adjusting PICVs generally comprise a thermoelectric head-type actuator provided with a pusher capable of linearly actuating the stem (known also as rod) closing the collar shutter in the valve body, obstructing and closing the fluid passage. Such actuator is typically connected to an electronic unit and is adapted to close the stem shutter of the valve, for example, as a function of the environment temperature. With reference to the flow rate pre-adjustment, such valves are further provided with an adjusting sleeve provided with an opening which, when rotating with the sleeve, enables to set a required maximum value of the fluid flow rate corresponding, for example, to the amount of maximum thermal energy to be transmitted.

Examples of flow rate dynamic balancing assemblies are described in documents WO-A-2018051150 and EP-A-3067772. Another example of fluid flow rate dynamic adjusting balancing valves is described in the European patent EP 3 201 500 (B1) in the name of the same Applicant and regarding a valve comprising means for statically adjusting the flow rate of the fluid and adapted to vary the cross-section of a passage hole between the inlet and outlet of the valve and flow rate dynamic balancing means adapted to adjust the flow rate of the fluid exiting the valve, as a function of the variation of the inlet fluid flow rate. The dynamic balancing means comprise a perforated element interposed between the inlet opening and an intermediate chamber in order to enable a fluid to flow only through at least one opening of the perforated element. Moreover, an elastic element is disposed at a face of the perforated element facing the fluid inlet opening in the valve body, so that, an increase of the pressure difference between the valve inlet and outlet is matched by an expansion of the elastic element reducing the passage area of the opening of the perforated element and ensuring a constant flow rate.

A serious drawback of the valves of the known type is the presence of high hydraulic pressures acting on the closing shutter. The models of valves of greater size and flow rates require a higher force for overcoming the force of the fluid pressure on the shutter. Consequently, as the valve size increases, larger shutters will be required and capable of generating on the shutter increasingly higher forces, in order to ensure the closure thereof. Such types of actuators, having a size proportional to the high involved forces, are also more expensive and consume more power.

SUMMARY OF THE INVENTION

An object of the present invention consists of overcoming and obviating, at least partially, the drawbacks and operative limits of the above discussed prior art. Specifically, an object of the present invention consists of providing a cartridge adjusting assembly and an associated hydraulic valve (of the PICV type, for example) which are capable of operating with small-size low-priced actuators, in comparison with the known types, for the same force required to cause the valve to close.

More particularly, according to a preferred embodiment, an object of the present invention consists of providing a cartridge adjusting assembly and an associated hydraulic valve (of a PICV type, for example) capable of being configured and adaptable to operate with different flow rate ranges: a range of greater flow rate levels and a range of smaller flow rate levels.

A further particular object of the present invention consists of providing a cartridge adjusting group and an associated hydraulic valve (of the PICV type, for example) having a high reliability and a long-term resistance and such to be easily and economically manufactured.

It is an object of the present invention a cartridge adjusting assembly as defined in claim 1 and particular embodiments thereof described in dependent claims from 2 to 10. According to a further aspect, it is an object of the invention a hydraulic valve described in claim 11 and a preferred embodiment thereof defined in claim 12.

BRIEF DESCRIPTION OF THE DRAWINGS

The structural and operative characteristics of the invention could be better understood from the following detailed description, which refers to the attached drawings representing some preferred non-limiting embodiments, wherein:

FIG. 4 is an axonometric schematic illustration from another point of view of the cartridge adjusting assembly of a hydraulic valve object of the present invention;

FIG. 5 is a schematic illustration of a plan view of the hydraulic PICV comprising a cartridge adjusting assembly object of the present invention;

DETAILED DESCRIPTION OF THE INVENTION

Figure 1:
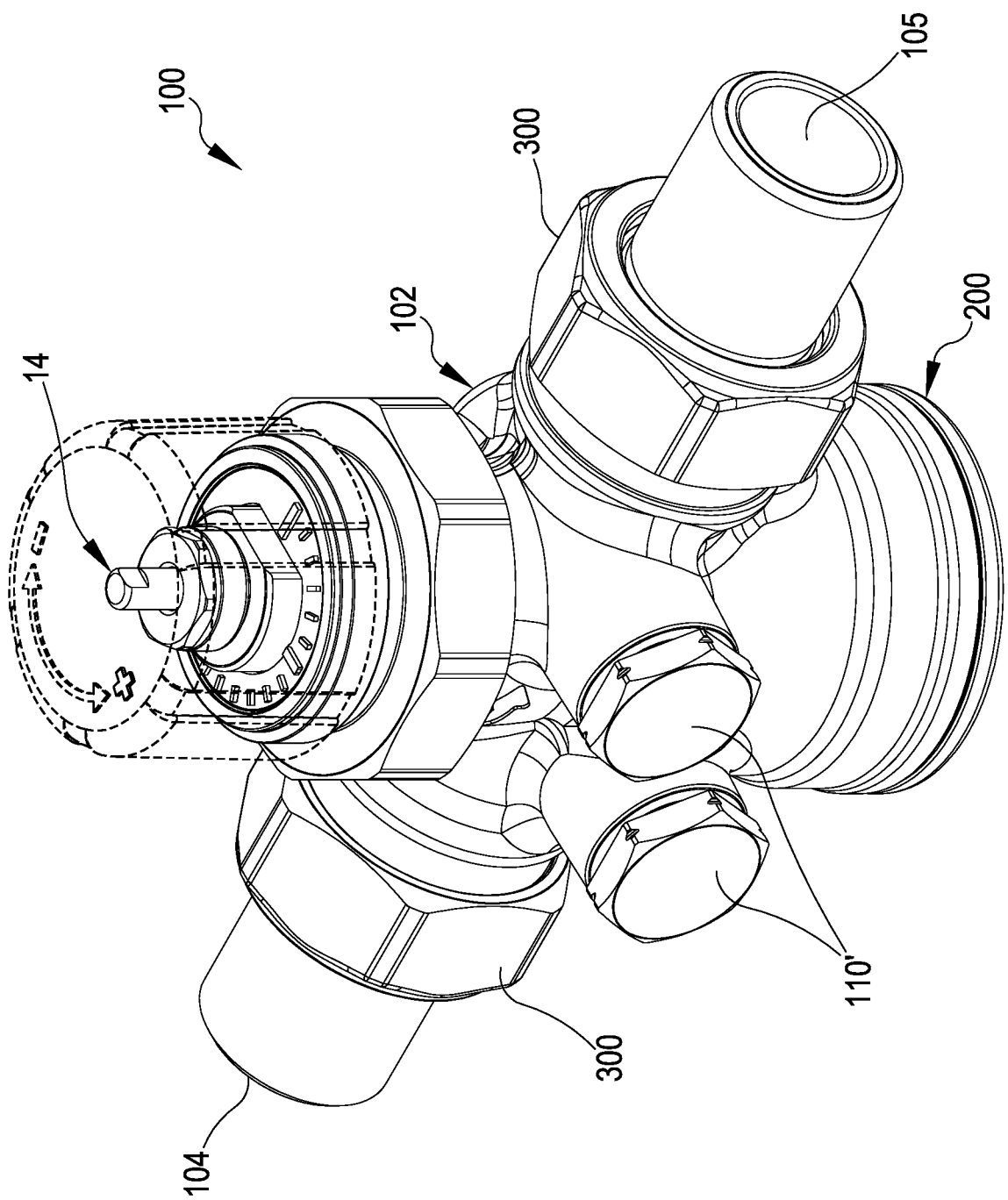
FIG. 1 is a schematic illustration of an axonometric view of a hydraulic PICV comprising a cartridge adjusting assembly object of the present invention.
Figure 2:
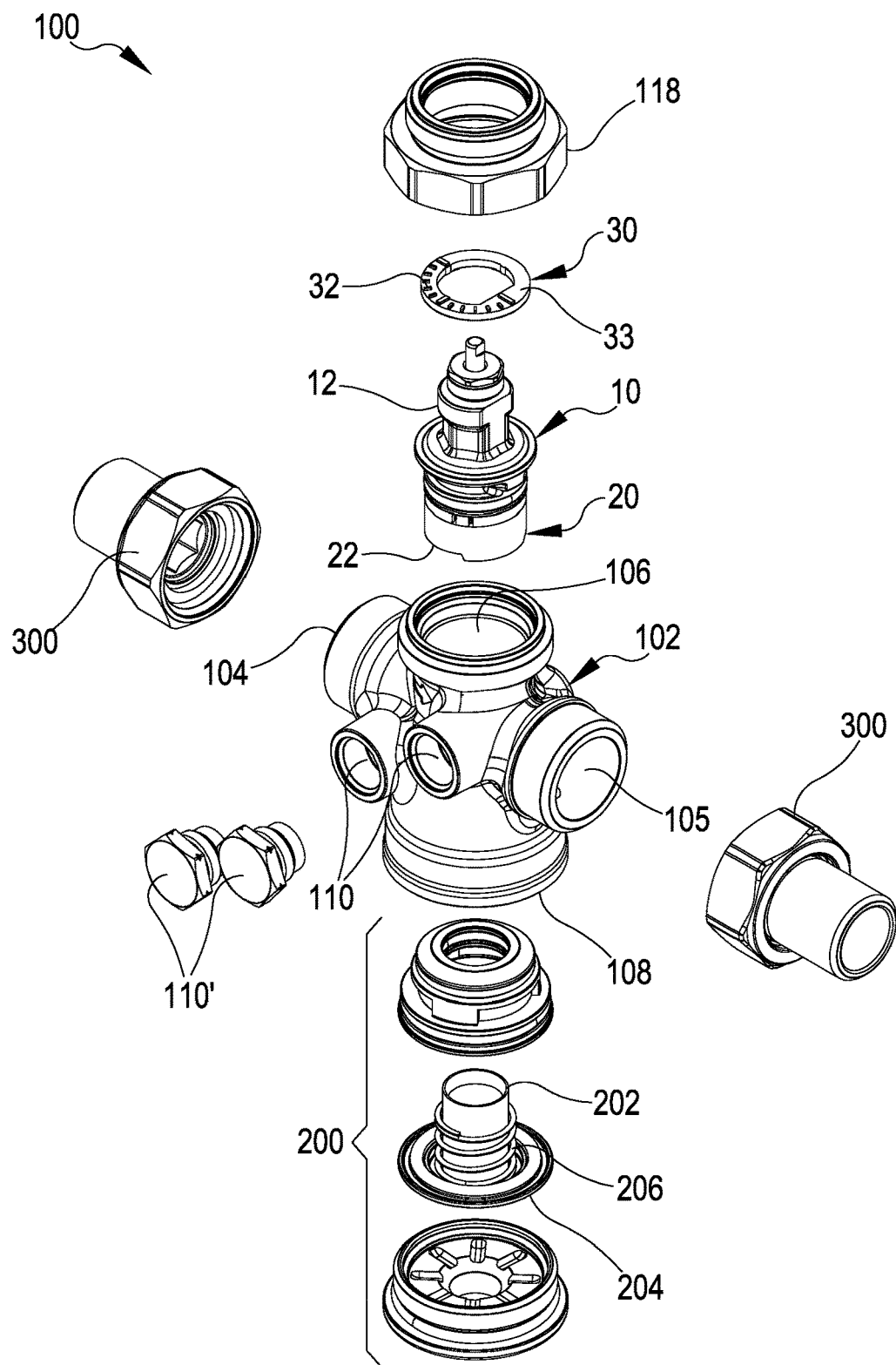
FIG. 2 is a schematic illustration of an exploded axonometric view of a hydraulic PICV comprising a cartridge adjusting assembly object of the present invention.

Referring particularly to the attached figures (particularly to FIGS. 1, 2, 4, 6, 7 and 9), a preferred embodiment of a hydraulic valve 100 of the PICV type (Pressure Independent Control Valve) according to the present invention is shown.

The valve 100 comprises a valve body 102 having an inlet opening 104, and outlet opening 105 and a handling opening 106. An opening 108, made in the valve body 102 of a valve, particularly of the PICV type, houses a dynamic pressure balancing or compensating assembly 200, known in the art. The balancing or compensating assembly 200 is configured to maintain constant the flow rate independently from upstream and downstream pressure conditions of the valve.

Such balancing assembly 200 generally comprises a tubular element 202 slidingly actuated by a flexible diaphragm 204 (made of an elastomeric material, for example) susceptible to a fluid pressure in the inlet opening 104 on a face thereof and to a fluid pressure at the outlet opening 105, on an opposite face thereof in order to lead the tubular element 202 to increase or limit the fluid flow into the valve 100, as a function of the pressure difference Δp between the inlet opening 104 and outlet opening 105. In addition, the balancing assembly 200 typically comprises also an elastic element 206 adapted to hold the tubular element 202 in a monostable position (in an opening position, for example).

The valve body 102 typically comprises also one or more servicing openings 110 adapted to service and control the valve 100 when is put in service; said servicing openings 110 are normally closed by plugs 110'.

The valve 100 is provided with an inner wall 112 with a passage opening 114 on which a cartridge adjusting assembly 10 and said balancing assembly 200 act.

Normally, the valve 100 can be also provided with conventional connecting connectors 300 placed at the inlet and outlet openings 104 and 105.

The attached Figures, particularly FIGS. 3, 4, 8 and 9, show a cartridge adjusting assembly 10, according to a particular embodiment, comprising a generally cylindrical cartridge body 12 slidingly receiving a rod 14. Said cartridge adjusting assembly is inserted into the valve body 102 at the handling opening 106.

A shutter 16 (a collar, for example) is attached to a first end 14' of the rod 14, inside the valve 100, the shutter is adapted to slide against the passage opening 114 of the valve 100 in order to adjust the fluid flow through the same, from a maximum amount to a complete closure of the opening. A second end 14" of the rod 14 is exposed outside the valve body 100 and is adapted to come in contact with a conventional mechanical or electromechanical actuator (not shown) destined to linearly move the rod 14 in order to close or open the passage opening 114 by the shutter 16.

Said rod 14 is also provided with a further elastic element 18 (a coil spring, for example) coaxially arranged around the rod 14 and in the cartridge body 12 in order to hold the rod 14 with the shutter 16 in a monostable position, normally open with respect to the opening 114 of the body 102. Such rod 14 and elastic element 18 are held in position in the cartridge body 12 by a first ferrule 19.

According to a particular embodiment, the cartridge adjusting assembly 10 (in the following just cartridge 10) further comprises a sleeve 20, substantially of a cylindrical tubular shape, attached to an inner end of the cartridge body 12.

Said sleeve 20 is adapted to adjust and limit the fluid flow exiting the passage opening 114 in the valve body 102 and directed towards the output opening 105 by means of at least one first shaped opening 22 and at least one second shaped opening 22' made on the outer cylindrical wall 24 of the sleeve 20 itself. The first opening 22 is shaped so that it enables to adjust the maximum flow rate of the valve inside a first range of fluid flow rate values according to a first scale. The second opening 22' is shaped so that it enables to adjust the maximum flow rate of the valve inside a second range of fluid flow rate values according to a second scale.

A first resolution is associated to said first scale and a distinct second resolution is associated to said second scale. The term "resolution" means the flow rate range obtainable as a function of the sleeve 20 rotation of a predetermined angular value.

Said first and second openings 22 and 22' of the sleeve 20 enable to preset the fluid maximum flow rate exiting the valve by a rotation of the sleeve 20 itself, by varying the passage cross-section towards the output opening 105.

The first and second openings 22 and 22' can have a shape open at the free end of the sleeve 20 (as shown in the figures) or can be integrally enclosed in the cylindrical wall 24. The first and second openings 22 and 22' are formed on portions of the cylindrical part 24 of the sleeve 20 which are separated by solid portions of said cylindrical wall 24 in order to selectively operate (in other words not simultaneously) in adjusting the fluid flow. Preferably, the first shaped opening 22 and second shaped opening 22' are made on portions in diametrally opposite positions of the cylindrical wall 24.

Moreover, both first and second shaped openings 22 and 22' have a cross-section facing a passage meatus 116 of the valve body 102, varying as a function of the sleeve 20 rotation. When the first shaped opening 22 faces said passage meatus 116, the second opening 22' is inactive, distally from the passage meatus 116 (and vice versa). Both said first and second openings 22 and 22' can comprise, in turn, more than one opening formed on the cylindrical wall 24, having reciprocally equal or different cross-sections, adapted to simultaneously or continuously face the passage meatus 116.

According to the example in the figures, the size of the first opening 22 is the greatest and the size of the second opening 22' is the smallest, in order to be capable of presetting two operative configurations of the valve 100, alternative to each other, in two different fluid flow or flow rate ranges: a range with greater flow rate levels and one with smaller flow rate levels.

Advantageously, said sleeve 20 can be made of a plastic, polymeric or thermoplastic, metal material or of other synthetized materials or made with additive manufacturing techniques. Advantageously, the sleeve 20 is attached to the cartridge body 12 by pressure interlocking means 25 formed on the inner diametral surface of the sleeve and on the end diametral surface of the cartridge 12.

Figure 3:
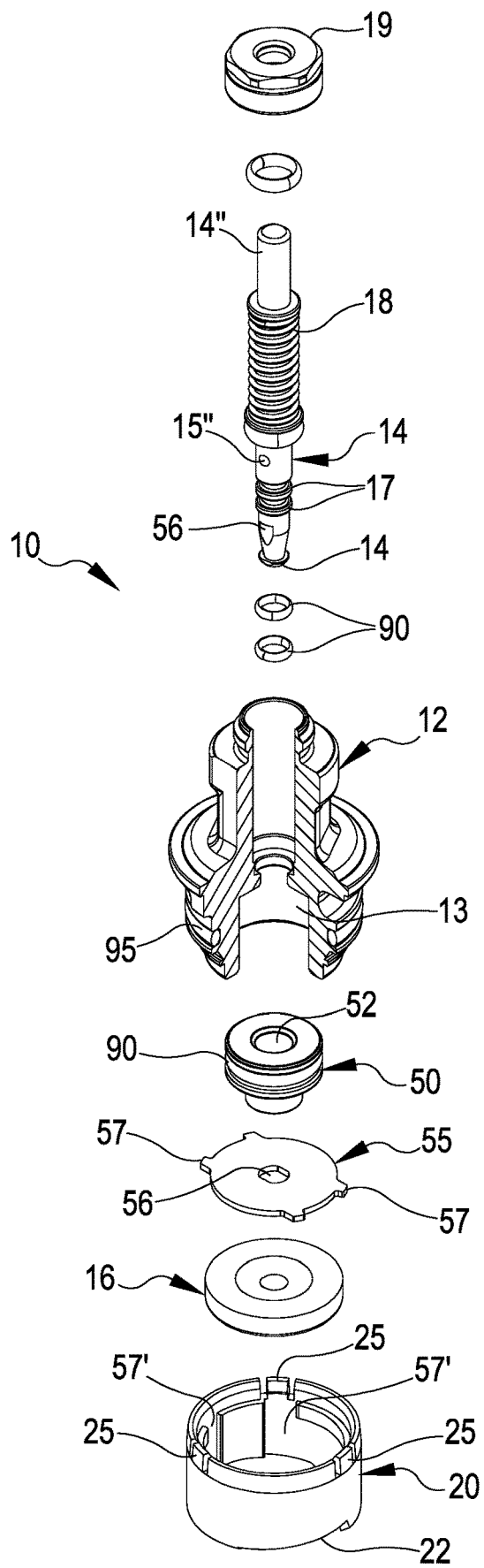
FIG. 3 is a schematic illustration of an exploded axonometric view of a cartridge adjusting assembly of a hydraulic valve object of the present invention.

The sleeve 20 can be put in rotation with the shutter body 12, but can also be put in rotation by the collar or washer 55 of the shutter 16 integral with the rod 14 by connecting means 56 with the same rod 14, as for example by flat portions made on the first end 14' of the rod 14 matched by a non-circular shaped opening of the same collar or washer 55, as shown in FIG. 3.

Still referring particularly to FIG. 3, acting on the rod 14, by a conventional wrench, at the second end 14", puts in rotation the rod with the collar 55 which in turn rotates the sleeve 20 by at least one protrusion 57 matched by a respective groove 57' formed on the inner surface of the sleeve 20. Said cartridge 10 further comprises graduated reference means 30 made on the cartridge 10 itself (for example, a disk) or directly formed on the same. The reference means 30 are adapted to graphically show from the outside of said valve 100, said first and second scales and are disposed on the cartridge body 12.

The reference means 30 are divided in at least two parts and comprise a first graduated scale 32 corresponding to the opening positions of the first shaped opening 22 and a second graduated scale 33 corresponding to the opening positions of the second shaped opening 22'.

The cartridge 10 can be fixedly or rotatively held in the valve body 12 by means of a second ferrule 118 (FIG. 2) attached to the handling opening 106. According to another embodiment, the cartridge 10 is integral with the valve body 12.

By specifically referring to FIG. 1, in the preferred embodiment of the figures, the cartridge 10 can be adjusted by a wrench acting on the second end 14" of the rod 14 and adapted to rotate said rod 14 and consequently the sleeve 20 with respect to the cartridge body 12, in order to perform a pre-adjustment of the flow rate of the valve 100. Once the pre-adjustment is performed, it is possible to install an electromechanical actuator (not shown) having a linear operation or an electrothermal head, disposed at the handling opening 106 of the valve 100 and adapted to be cooperatively connected to the rod 14 of the cartridge 10.

Figure 6:
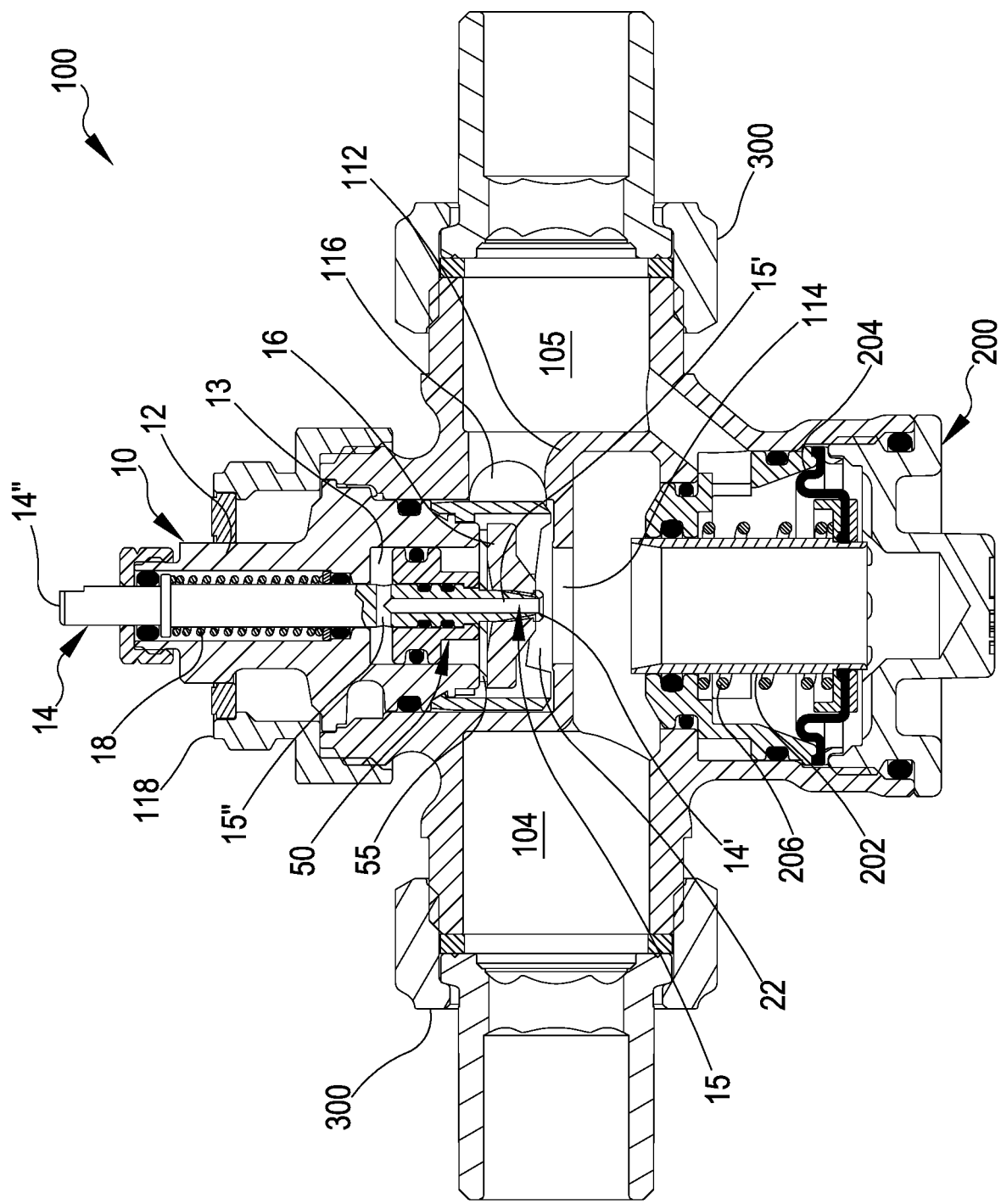
FIG. 6 is a schematic illustration of a cross-section view according to the plane VI of FIG. 5 of the hydraulic PICV comprising the cartridge adjusting assembly object of the present invention.
Figure 7:
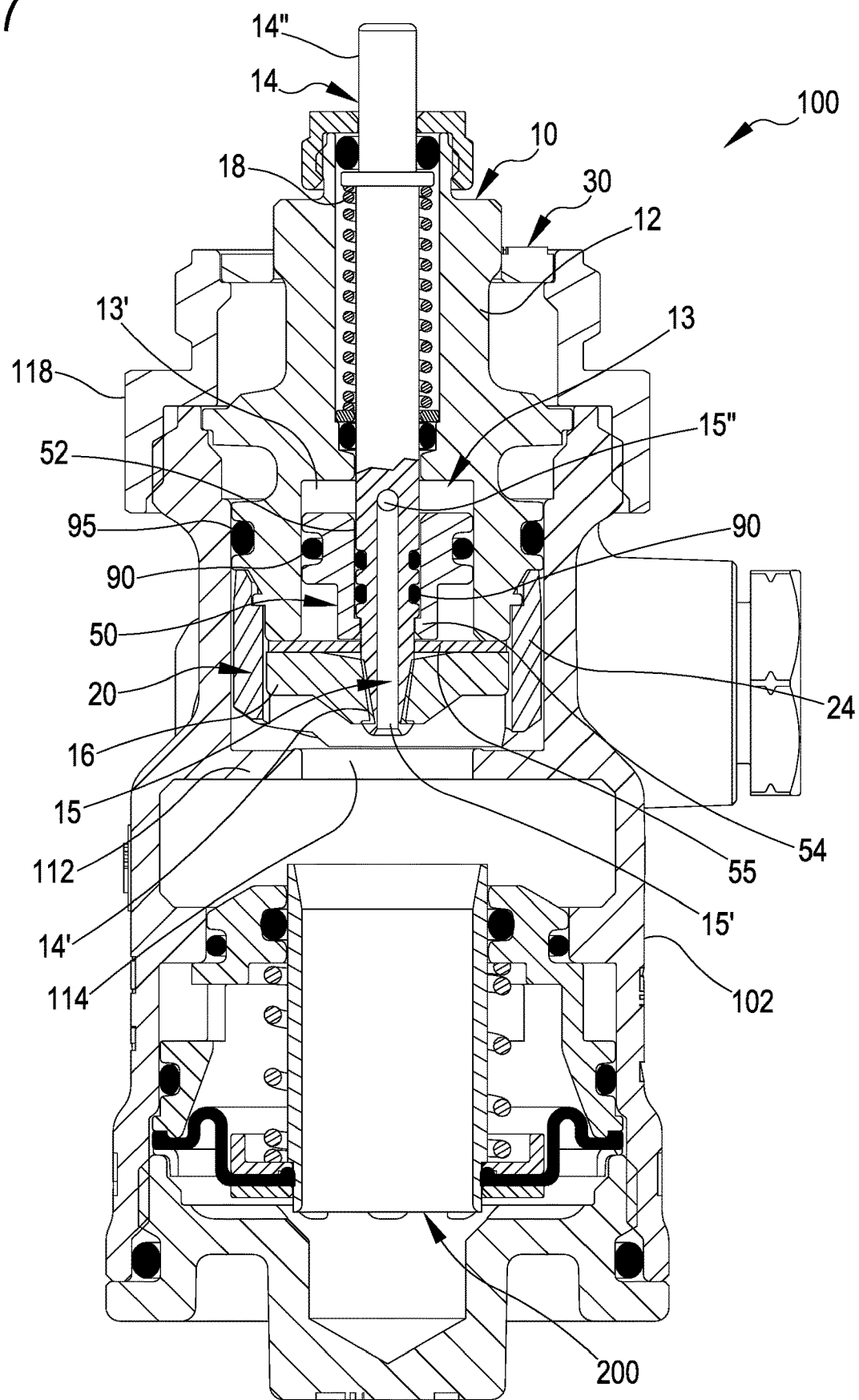
FIG. 7 is a schematic illustration of a cross-section view according to the plane VII of FIG. 5 of the hydraulic PICV comprising the cartridge adjusting assembly object of the present invention.
Figure 8:
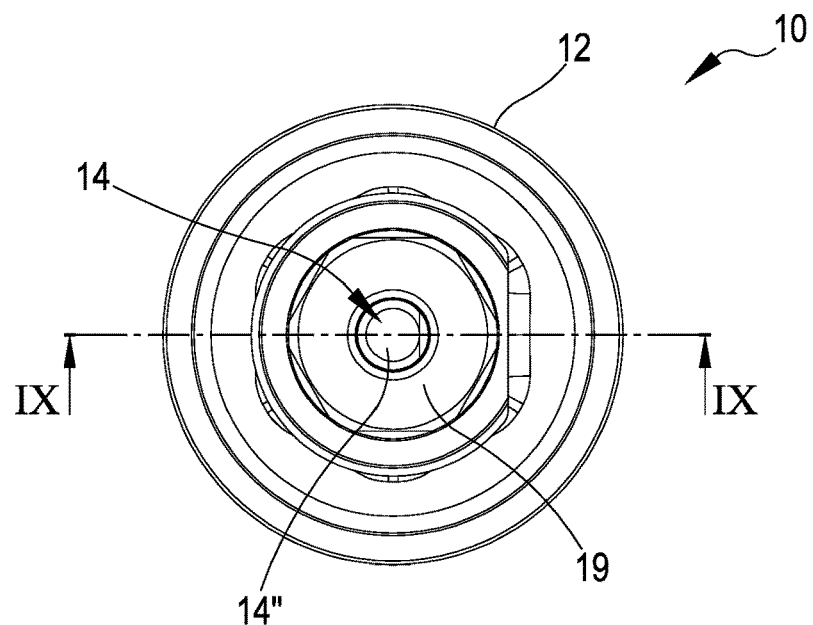
FIG. 8 is a schematic illustration of a plan view of the cartridge adjusting assembly object of the present invention.
Figure 9:
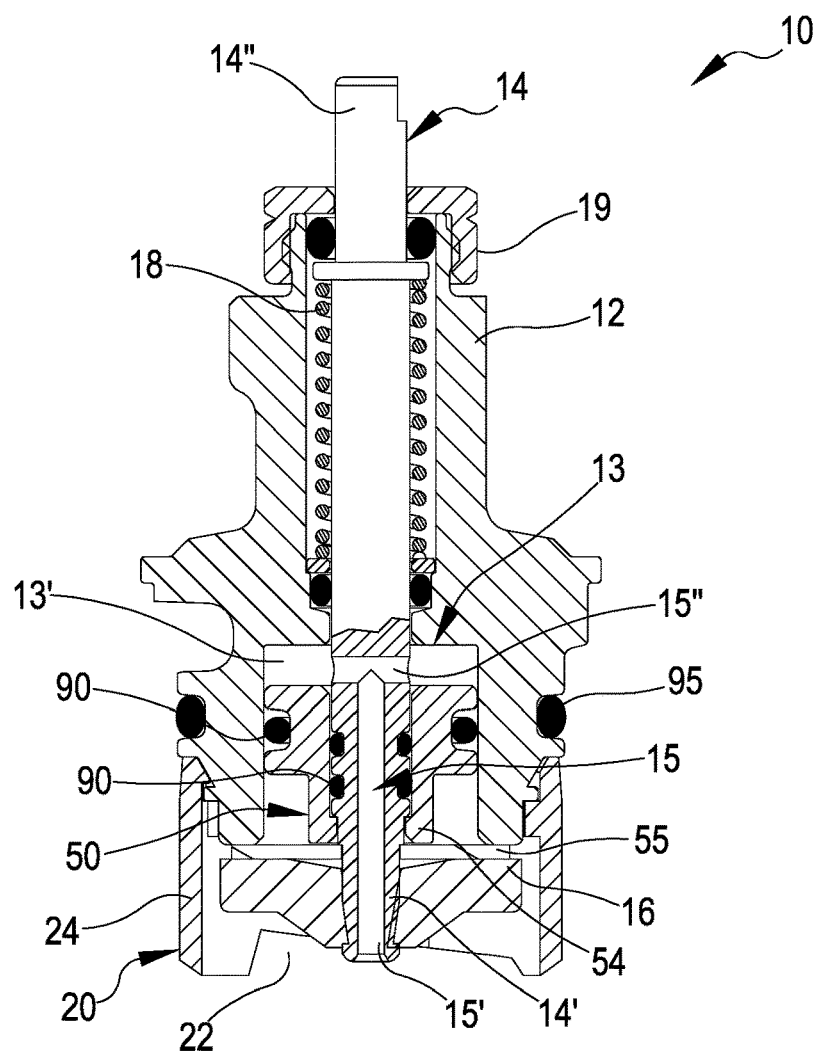
FIG. 9 is a schematic illustration of a cross-section view according to the plane IX of FIG. 8 of the cartridge adjusting assembly object of the present invention.

Referring particularly to FIGS. 6, 7 and 9, in a preferred embodiment, the rod 14 of the cartridge assembly 10 can also comprise a compensating conduit 15 (FIG. 9) extending at least partially along the rod 14 axis and having an opening 15' at the first end 14' and at least a further opening 15" at said outer diametral surface of the rod 14 itself. The further opening 15", on the outer diametral surface of the rod 14, is in fluid communication with a chamber 13 made in the cartridge 12. The compensating conduit 15 can also have a curved shape.

Said chamber 13 receives, through a central hole 52, a piston 50 integral with the rod 14 in order to slide with the rod itself inside said chamber 13. The piston 50 is attached to the rod 14 by fixing means 54 comprising, for example, elastically deformable interlocking means. Specifically, the fixing means 54 comprise one or more diametral rings formed on the inner surface of the central body 52 and cooperating with further lateral rings 17 formed on the outer lateral surface of the rod 14. Moreover, the piston 50 is prevented from axially translating towards the first end 14' of the shutter 16 attached at the end of the rod 14. For example, said shutter 16 can be advantageously disposed on the rod 14 with a collar or washer 55 adapted to cause the shutter 16 to abut the cartridge body 12.

Advantageously, the piston 50 can be made of a plastic, thermoplastic, polymeric, or thermopolimeric or metal material, or other synthetized materials or is made by additive manufacturing techniques.

The opening 15" of the compensating conduit 15 can comprise a transversal hole or conduit (for example, radial) which can be through, in other words, it extends along all the cross-section of the rod 14 or partially extends in the rod 14 in order to be always in fluid communication both with the compensating conduit 15 and chamber 13. The piston 50 is also provided with fluidic sealing elements 90 (for example, lip seals or O-rings of elastomeric material) disposed between the inner diametral surface of the central hole 52 and the outer diametral surface of the rod 14, and between the outer diameter surface of the piston 50 and the inner diametral surface of the chamber 13.

Particularly, the further opening 15" is in fluid communication with a portion 13' of the chamber 13 interposed between the piston 50 and second end 14" of the rod 14. More particularly, such portion 13' of the chamber 13 on which the further opening 15" opens, is interposed between the piston 50 and elastic element 18. It is observed the portion 13' is always fluid tightly isolated from the passage opening 114.

Advantageously, said sealing elements 90 can be received inside suitable annular housings or recesses formed on the outer surface of the piston 50 and rod 14.

Advantageously, the cartridge 10 can be provided with a sealing element 95 in order to ensure a fluid tightness between the cartridge 10 itself and valve body 12.

From the above given description of the valve 100 it is inferred the operation of the same described in the following.

The cartridge 10 inserted in the valve 100 of the present description has the advantageous characteristic of a sleeve 20 capable of enabling the valve 100 to operate with different flow rate scales, different dimensions or very different from each other. For example, it is possible to operate according to a configuration adapted to high fluid flow applications and according to a low fluid flow configuration with the same valve and inner components.

More particularly, an operator, when installing a valve, can configure it according to a preselected configuration by a wheel 400 by putting in rotation the cartridge 10 and the sleeve 20 integral with the former. For example, the operator selects the operative range with reference to a configuration by rotating the wheel 400 and cartridge 10 according to the first graduated scale 32 with different opening degrees corresponding to different positions of the first shaped opening 22 facing the passage meatus 116. In such configuration, the second shaped opening 22' remains inactive distally positioned from the passage meatus. Analogously, the operator can configure the valve 100 by rotating the wheel 400 on the second graduated scale 33, in order to operate with the second shaped opening 22' facing the passage meatus 116.

Different positions of the cartridge 10 indicated by each of the first and second graduated scales 32 and 33 correspond to different selected flow rates from a minimum flow rate to a maximum one associated to two different operative configurations.

According to a particular example, when the configurations are switched, the sleeve 20 is in a non-operative intermediate position clearly distinct from the two operative configurations. The term "non-operative position" means a position in which the outer cylindrical part 24 faces the passage meatus 116 without an adjusting configuration belonging to the first or second openings 22, 22', in which neither a fluid flow nor a limited fluid flow is available. Generally, by setting a minimum value of the configuration ranges on one of the graduated scales 32 and 33, the fluid flow rate is never completely blocked.

Referring to FIGS. 1, 6 and 7, if it is required to close the valve 100 by the shutter 16, the electromechanical actuator (not shown) acts on the second end 14' of the rod 14 by downwardly thrusting it, by overcoming the force of the further elastic element 18, in order to take the shutter 16 in contact with the edge of the passage opening 114, blocking the fluid flow between the inlet opening 104 and outlet opening 105.

Figure 10:
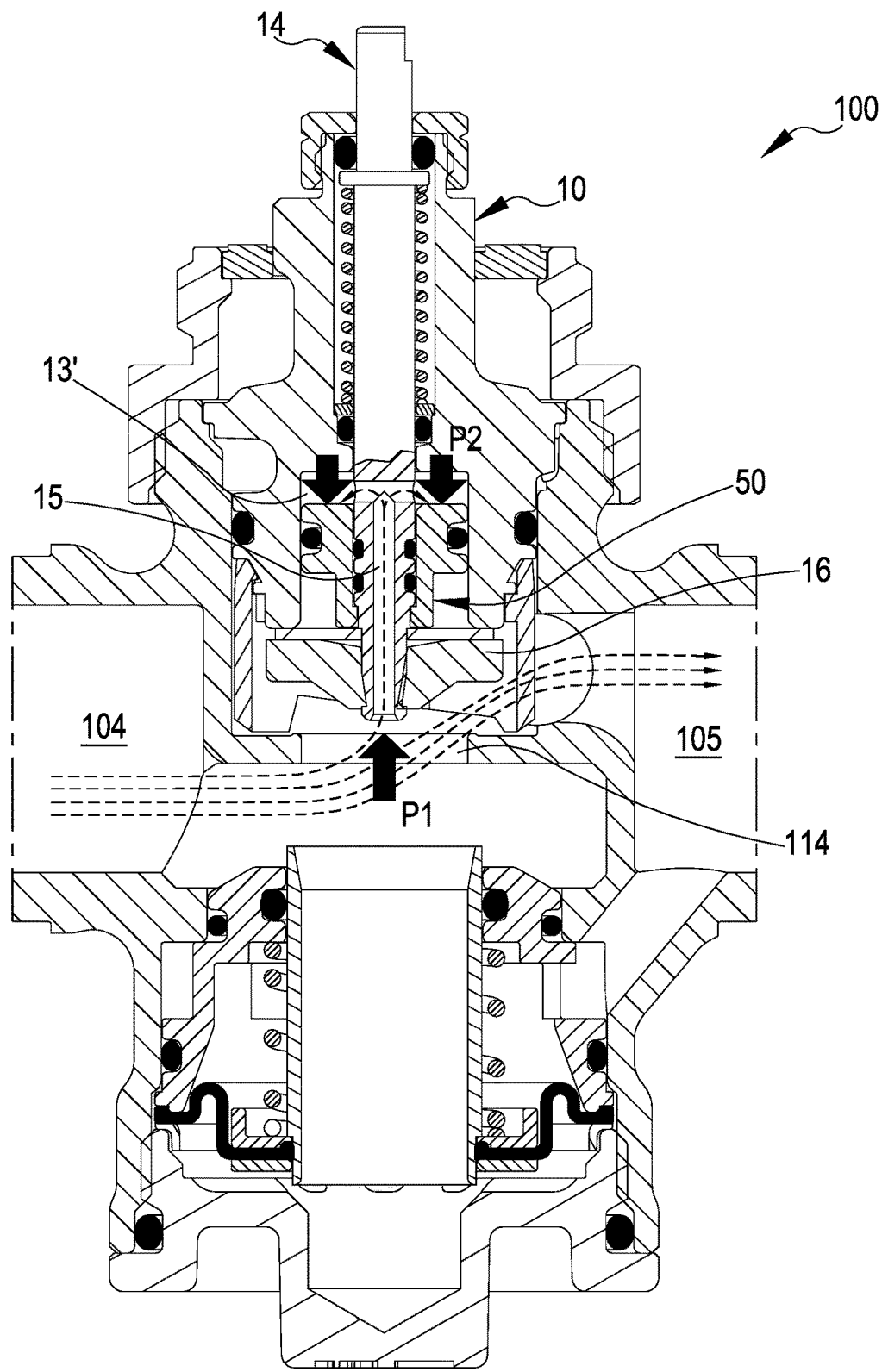
FIG. 10 is a schematic illustration of a longitudinal cross-section showing the operation of the valve 100 and the distribution of pressures P1 and P2 in the valve members.

Referring particularly to FIG. 10, being the chamber 13 in fluid communication with the passage opening 114 by the compensating conduit 15, the pressure P1 of the fluid flowing through and at the passage opening 114, is equal to the pressure P2 in the portion 13' of the chamber 13, during the step of closing the shutter 16. Therefore, it is generated a force F2 acting on the piston surface 50 facing the portion 13' of the chamber 13, which counters the force F1 exerted by the pressure P1 of the flowing fluid, compensating the same. This makes the shutter 16 actuatable by the associated rod 14 by a reduced force of the electromechanical actuator and mainly generated by the further elastic element 18, which remains generally constant as the pressure P1 increases.

The opening 15' of the compensating hole 15 is in a position near the closure of the shutter 16 at the passage opening 114, so that the same pressure countering the closure of the shutter 16 is transferred to the portion 13' of the chamber 13. This characteristic enables an accurate compensation which tends to eliminate the forces acting on the shutter 16 by a force of an equal modulus exerted on the piston 50 surface facing the portion 13' of the chamber 13.

The cartridge assembly and associated hydraulic valve 100 are particularly advantageous. The described solution, providing the compensation of the force acting on the shutter during the closing step, enables the use of smaller and less expensive actuators having a reduced power consumption with respect to the ones of the prior art. It is observed that the use of a small-sized actuator is convenient also from the point of view of the size, enabling to install the valve in confined spaces and cassettes. Moreover, using a conduit linearly extending inside a rod does not limit the stroke of the rod itself. A further advantage of the described structure is that the compensating pressure in the chamber 13 is exactly the same pressure acting on the shutter 16 at the passage opening 114 of the valve 100. The fluid flow pressure at said passage opening 114 is indeed slightly less than the pressure in other parts of the valve due to the Venturi effect. The fluid connection between the passage opening 114 and chamber 13, through the conduit 15, ensures a perfect balance of the forces generated by the pressures on the piston 50, and an accuracy of the closure, for example, also by a feedback with electromechanical actuators, for example, electrothermal heads. The particular solution with the sleeve provided with plural openings associated to different flow rate pre-adjustment scales enables to use a single device or valve with a single model for each standardized dimension. In this way, it is eliminated the requirement of providing two types of the same valve differing only for the flow rate pre-adjustment range performed by the sleeve 20, by consequently reducing the manufacturing, storage, and marketing costs due to a single type of valve having a standard dimension of the connections. A further advantage refers to a particular solution which enables to provide a valve adjustable according to two different flow rate ranges, which partially overlap each other or are also completely separated from each other, and to balance the flow rate in a range of Δp values on both the ranges.

While the invention has been hereinbefore described by particularly referring to some preferred embodiments, given in an exemplifying non-limiting way, many modifications and variants will be apparent to a person skilled in the art from the above given description.

For example, the present invention can also be applied to hydraulic valves different from the PICVs and therefore not provided with the balancing assembly 200. Further, the teachings of the present invention can be also applied to valves exhibiting a pre-adjustment performed in a conventional way, and in other words, for example, by a sleeve enabling to pre-adjust the flow rate inside only one range of values. Moreover, it is possible to apply the present invention to hydraulic valves without any pre-adjustment.

The invention claimed is:

1. A cartridge flowrate adjusting assembly for a hydraulic valve, comprising:
   a cartridge body;
   a rod slidingly disposed in the cartridge body and having a first end and a second end opposite the first end;
   a shutter integral formed with the first end of said rod to be slidingly placed against a passage opening of the valve for regulating flow;
   an elastic element coaxially disposed on the rod and in a cavity of the cartridge body to hold the rod with the shutter in a monostable position with respect to the opening of the body;
   a plunger element integral with the rod and slidingly disposed in a chamber of said cartridge body coaxial with said rod and interposed between the shutter and second end;
   a conduit made in said rod and having:
      a first opening at the first end of the rod and in fluid communication with the passage opening of the valve, and
      at least one second opening in fluid communication with a portion of the chamber disposed between the plunger and second end, so that a pressure in said portion of the chamber is equal to a pressure at the passage opening; and a cylindrical sleeve rotatably disposed inside the hydraulic valve to face a passage dap, wherein the sleeve comprises:
  at least one first opening in a wall of the sleeve and shaped to enable adjustment of a maximum flow rate of the valve within a first range according to a first scale; and
  at least one second opening in said wall that is capable of regulating the maximum flow rate of the valve within a second range according to a second scale.

2. The assembly according to claim 1, wherein said chamber is interposed between the shutter and elastic element, and wherein said portion of the chamber is interposed between the plunger and elastic element.

3. The assembly according to claim 1, wherein the conduit is positioned axial to the rod and in fluid communication with at least one conduit positioned transverse to the rod.

4. The assembly according to claim 1, wherein said conduit is curvilinear.

5. The assembly according to claim 1, wherein said plunger is provided with fluidic sealing elements disposed between:
  an external surface of the plunger and an internal surface of the chamber, and
  between an internal surface of a central hole of the plunger and an external surface of the rod.

6. The assembly according to claim 1, wherein said plunger is made of a material selected from the group comprising: plastic, thermoplastic, polymer, thermopolymer, metal, and sinterized materials.

7. The assembly according to claim 1, wherein said plunger is made by additive manufacturing techniques.

8. The assembly according to claim 1, wherein a first resolution is associated to said first scale and a second resolution is associated to said second scale.

9. The assembly according to claim 1, comprising graduated references to graphically represent said first and second scales.

10. A hydraulic valve comprising:
  a valve body having an inlet opening, an outlet opening, and a handling opening; and
  a cartridge flowrate adjusting assembly comprising:
    a cartridge body;
    a rod slidingly disposed in the cartridge body and having a first end and a second end opposite the first end;
    a shutter integral formed with the first end of said rod to be slidingly placed against a passage opening of the valve for regulating flow;
    an elastic element coaxially disposed on the rod and in a cavity of the cartridge body to hold the rod with the shutter in a monostable position with respect to the opening of the body;
    a plunger element integral with the rod and slidingly disposed in a chamber of said cartridge body coaxial with said rod and interposed between the shutter and second end;
    a conduit made in said rod and having:
      a first opening at the first end of the rod and in fluid communication with the passage opening of the valve, and
      at least one second opening in fluid communication with a portion of the chamber disposed between the plunger and second end, so that a pressure in said portion of the chamber is equal to a pressure at the passage opening;
    a cylindrical sleeve rotatably disposed inside the hydraulic valve to face a passage gap, wherein the sleeve comprises:
      at least one first opening in a wall of the sleeve and shaped to enable adjustment of a maximum flow rate of the valve within a first range according to a first scale; and
      at least one second opening in said wall that is capable of regulating the maximum flow rate of the valve within a second range according to a second scale.

11. The hydraulic valve according to claim 10, further comprising a balancing assembly comprising a tubular element slidingly actuated by a flexible membrane sensitive to a fluid pressure in the inlet opening on a face thereof, and to the fluid pressure at the outlet opening, on an opposite face thereof, in order to cause the tubular element to increase or limit the fluid flow in the valve as a function of a pressure difference between the inlet opening and outlet opening.

12. The hydraulic valve according to claim 10, wherein said valve is of the Pressure Independent Control Valve (PICV) type, and includes a balancing assembly configured to maintain constant a flow rate independent from upstream and downstream pressure conditions of the valve.

13. The hydraulic valve according to claim 10, wherein said chamber of the cartridge flowrate adjusting assembly is interposed between the shutter and elastic element, and wherein said portion of the chamber is interposed between the plunger and elastic element.

14. The hydraulic valve according to claim 10, wherein the conduit of the cartridge flowrate adjusting assembly is positioned axial to the rod and in fluid communication with at least one conduit positioned transverse to the rod.

15. The hydraulic valve according to claim 10, wherein said plunger of the cartridge flowrate adjusting assembly is provided with fluidic sealing elements disposed between:
  an external surface of the plunger and an internal surface of the chamber, and
  between an internal surface of a central hole of the plunger and an external surface of the rod.

16. The hydraulic valve according to claim 10, wherein said plunger of the cartridge flowrate adjusting assembly is made of a material selected from the group comprising: plastic, thermoplastic, polymer, thermopolymer, metal, and sinterized materials.

17. The hydraulic valve according to claim 10, wherein a first resolution is associated to said first scale and a second resolution is associated to said second scale.

18. The hydraulic valve according to claim 10, comprising graduated references to graphically represent said first and second scales.

* * * * *